United States Patent [19]

Yamada

[11] Patent Number: 4,938,612
[45] Date of Patent: Jul. 3, 1990

[54] BEARING ASSEMBLY WITH WHEEL REVOLUTION DETECTOR

[75] Inventor: Tsueneo Yamada, Kuwana, Japan

[73] Assignee: NTN Toyo Bearing Co., Ltd., Osaka, Japan

[21] Appl. No.: 352,593

[22] Filed: May 16, 1989

[51] Int. Cl.⁵ .............................................. F16C 19/52
[52] U.S. Cl. .................................... 384/446; 384/448
[58] Field of Search ............... 384/446, 448, 912, 506, 384/512; 340/682

[56] References Cited

U.S. PATENT DOCUMENTS

| | | | |
|---|---|---|---|
| 4,688,951 | 8/1987 | Guers | 384/448 |
| 4,732,494 | 3/1988 | Guers et al. | 384/446 |
| 4,778,286 | 10/1988 | Kadokawa | 384/448 |

Primary Examiner—Lenard A. Footland
Attorney, Agent, or Firm—Armstrong, Nikaido, Marmelstein, Kubovcik & Murray

[57] ABSTRACT

A bearing assembly with a revolution detector for detecting the number of revolutions of a vehicle wheel. It includes a pulse ring made of a ferromagnetic material into a multipolar magnet and fixedly mounted on the outer periphery of the inner ring and a sensor mounted on the outer ring at a position opposite to the pulse ring. The pulse ring has a mounting portion fixed to the inner ring, an uprising portion extending radially and outwardly from one end of the mounting portion, and a flange portion extending from the outer end of the uprising portion in parallel with and opposite to the mounting portion. The flange portion has its outer surface magnetized into a multipolar magnet.

2 Claims, 1 Drawing Sheet

BEARING ASSEMBLY WITH WHEEL REVOLUTION DETECTOR

The present invention relates to a bearing assembly with a wheel revolution detector for detecting the number of revolutions of a wheel to control an automobile by means of an antiskid brake system (hereinafter referred to as ABS).

A vehicle-mounted ABS is used to control the braking force on the basis of the number of revolutions of the wheel so as to prevent the wheels from locking or skiding. The ABS thus requires a revolution detector for detecting the number of revolutions of the wheel.

FIG. 3 shows a prior art bearing assembly with a revolution detector for a wheel. The detector comprises a gear-shaped pulse ring 3 press-fitted on the outer ring 2 of a wheel bearing assembly 1 at its one end and an electromagnetic sensor 4 provided opposite to the pulse ring 3.

Since the pulse ring 3 is generally made of stainless steel to stave off rust, high material and working costs and increased weight were problems.

Further, since the pulse ring 3 is provided outside the wheel bearing assembly 1, it absorbs dust, so that the detecting accuracy might drop. Another problem is that the electromagnetic sensor 4 is incapable of detecting any wheel speed lower than a given point.

In order to prevent such problems, the present applicant proposed a revolution detector in Japanese Utility Model application No. 62-83803 which comprises a pulse ring in the form of a multipolar magnet fixed to the outer periphery of the inner rings of the wheel bearing assembly and a sensor mounted on the outer ring at a position opposite to the pulse ring.

As the pulse ring, a ferrite magnet or a plastic magnet has been used. But a ferrite magnet, which is made by sintering, has a poor strength, while a plastic magnet is liable to change in dimensions and strength with temperature change. Thus, in terms of strength, these magnets are not sufficient to be fitted on the inner rings of the bearing assembly.

Therefore, in order to use these magnets as the pulse ring, a ferrite magnet has to be wrapped in a rubber sheet and a plastic magnet has to be made by mixing a resin less susceptible to heat. Such arrangements will not only increase the cost but also make it difficult to mount the pulse ring stably on the inner rings.

It is an object of the present invention to provide a bearing assembly with a revolution detector for a vehicle wheel which obviates the abovesaid shortcomings, which is less susceptible to temperature change in the bearing, which can be stably mounted on the outer periphery of an inner ring of the bearing, and which can be made inexpensively.

In accordance with the present invention, there is provided a bearing assembly with a wheel revolution detector, the bearing assembly comprising an outer ring, a pair of inner rings mounted in the outer ring, and a plurality of rolling elements interposed between the outer ring and the inner rings, the revolution detector comprising a pulse ring made by pressing a ferromagnetic material into a multipolar magnet and fixedly mounted on the outer periphery of one of the inner rings, and a sensor mounted on the outer ring at a position opposite to the pulse ring.

The pulse ring in the form of a multipolar magnet made by pressing a ferromagnetic material is fixedly mounted on the outer periphery of its inner ring so as to be rotatable together with the inner rings. The sensor mounted on the outer ring detects the number of revolutions of the pulse ring and thus of the wheel.

The pulse ring made by press-molding a ferromagnetic material is less susceptible to heat fluctuations in the bearing and can be mounted stably on the outer periphery of one of the inner rings. Also, since the pulse ring is made by press-molding, it can be shaped with high accuracy. The pulse ring mounted inside the bearing assembly is kept from being smeared with dust. This will improve the detection accuracy.

Other features and objects of the present invention will become apparent from the following description taken with reference to the accompanying drawings, in which.

Figure 1:
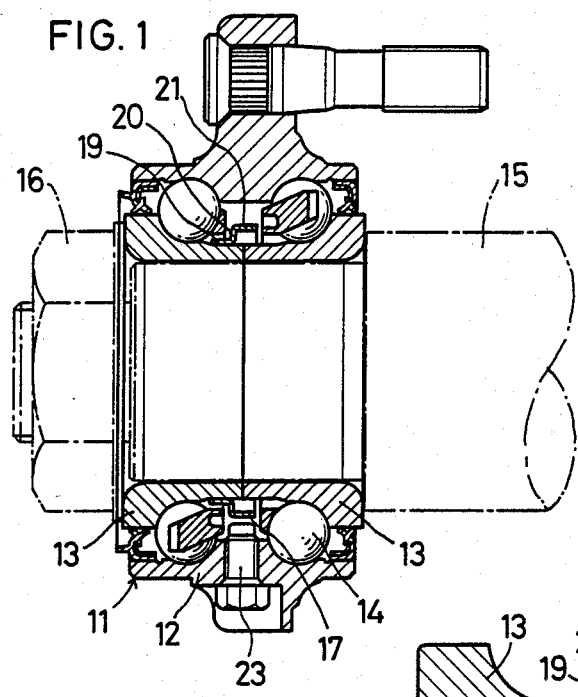
FIG. 1 is a vertical sectional view of the bearing assembly with a wheel revolution detector embodying the present invention.

As shown in FIG. 1, a wheel bearing assembly 11 for a vehicle wheel comprises an outer ring 12, a pair of inner rings 13 rotatably mounted inside the outer ring 12 to support a wheel shaft 15, and a plurality of rolling elements 14 interposed between the outer ring 12 and the inner rings 13. The inner rings are tightened together in the axial direction of the shaft 15 by means of a nut 16 in threaded engagement with the wheel shaft 15.

A pulse ring 17 is made by press-molding a ferromagnetic material into a ring-shaped multipolar magnet and is mounted in the bearing assembly 11 on the outer periphery of one of its inner rings 13.

The ferromagnetic material should preferably be an Fe-Cr-Co alloy. The pulse ring 17 comprises a mounting portion 19 adapted to be fixedly mounted on the outer periphery of one of the inner rings 13, an uprising portion 20 extending radially and outwardly from one end of the mounting portion 19, and a flange portion 21 extending axially from the outer end of the uprising portion 20 in parallel with and in the opposite direction to the mounting portion 19. The flange portion 21 has its top surface 22 magnetized so that N and S poles will be arranged alternately at equal angular intervals. For easy magnitization, the pressed material should preferably be subjected to solution treatment.

The pulse ring 17 has its mounting portion 19 fixedly mounted on the outer periphery of one of the inner rings 13 so as to be rotatable together with the inner rings 13. The flange portion 21 having the magnetized top surface 22 is spaced apart from the outer periphery of the inner rings 13. A sensor 23 having a Hall IC is mounted on the outer ring 12 at a position opposite to the magnetized surface 22.

Figure 2:
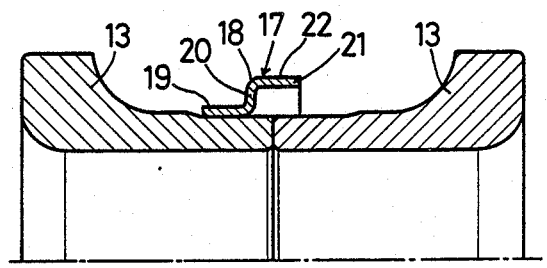
FIG. 2 is an enlarged vertical sectional view of a portion of the same.
Figure 3:
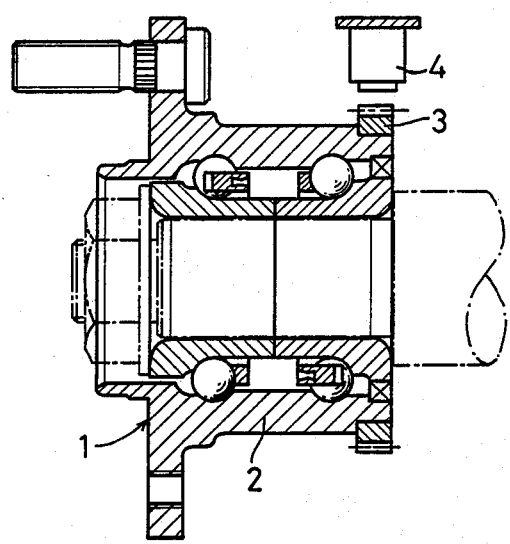
FIG. 3 is a vertical sectional view of a prior art bearing assembly with a wheel revolution detector.

Since the pulse ring 17 has such a sectional shape as shown in FIG. 2, not only can its mounting portion 19 be located clear of the retainer but also the overall widthwise dimension can be reduced. Further, neither of the inner rings 13 requires special machining to mount the pulse ring 17 thereon. Thus the inner rings 13 can be made symmetrically to each other.

The pulse ring 17 is adapted to rotate together with the inner rings 13. An alternating magnetic field is generated when the pulse ring 17 rotates because its top surface 22 is magnetized so that N-poles and S-poles are arranged alternately at equal intervals. The Hall IC sensor 23 detects the number of revolutions of the inner rings 13 from the alternating magnetic field.

What is claimed is:

1. A bearing assembly with a wheel revolution detector, said bearing assembly comprising an outer ring, a pair of inner rings mounted in said outer ring, and a plurality of rolling elements interposed between said outer ring and said inner ring; said revolution detector comprising a multipolar magnetic pulse ring of ferromagnetic material fixedly mounted on the outer periphery of one of said inner rings and a sensor mounted on said outer ring at a position opposite to said pulse ring, said pulse ring comprising a mounting portion for fixedly mounting to the outer periphery of said one of said inner rings, an uprising portion extending radially and outwardly from one end of said mounting portion, and a flange portion extending from the outer end of said uprising portion in parallel with and in the opposite direction to said mounting portion, said flange portion having its outer surface magnetized into a multipolar magnet.

2. A bearing assembly as claimed in claim 1, wherein said ferromagnetic material is an Fe-Cr-Co alloy.

* * * * *